United States Patent [19]

Knepler et al.

[11] Patent Number: 5,026,969
[45] Date of Patent: Jun. 25, 1991

[54] APPARATUS FOR MELTING AND HEATING SHORTENING

[75] Inventors: John T. Knepler, Chatham; James H. Anson, Auburn; Alan W. Brewer, Divernon, all of Ill.

[73] Assignee: Bunn-O-Matic Corporation, Springfield, Ill.

[21] Appl. No.: 427,046

[22] Filed: Oct. 25, 1989

[51] Int. Cl.⁵ .................. F27B 14/00; A23L 27/00; A47J 27/00; B67D 5/62
[52] U.S. Cl. .................................. 219/421; 219/420; 219/425; 99/325; 99/330; 99/486; 222/146.5
[58] Field of Search ............... 219/420, 421, 422, 423, 219/425, 536, 422, 405, 403; 99/330, 325, 401, 486; 165/120; 222/1, 4, 146.1, 146.5; 122/13 R

[56] References Cited

U.S. PATENT DOCUMENTS

| | | | |
|---|---|---|---|
| 467,538 | 1/1892 | Gutmann | 219/406 |
| 2,686,109 | 8/1954 | Moule | 219/421 |
| 3,259,056 | 7/1966 | King | 99/325 |

Primary Examiner—Bruce A. Reynolds
Assistant Examiner—Tuan Vinh To
Attorney, Agent, or Firm—Richard Bushnell

[57] ABSTRACT

Apparatus for melting and heating shortening includes a housing having a top, a bottom and sidewalls; a heating grid mounted in the housing and spaced above the bottom thereof for melting shortening and allowing melted shortening to pass therethrough toward the bottom of the housing. A door is mounted to the housing for introducing a block of shortening onto the heating grid. A bottom heater is mounted adjacent the housing bottom for maintaining the melted shortening at a desired temperature. A control circuit maintains control of the operation of both the heating grid and the bottom heater in a predetermined fashion for initially melting a block of shortening introduced onto the heating grid while substantially preventing smoking of the same, and for maintaining melted shortening at the desired temperature.

12 Claims, 4 Drawing Sheets

APPARATUS FOR MELTING AND HEATING SHORTENING

BACKGROUND OF THE INVENTION

The invention is directed generally to the heating apparatus arts and more particularly to a novel and improved shortening and heating apparatus for use in melting large cubes of shortening and thereafter holding a supply of melted shortening at a relatively stable temperature, to be dispensed in desired quantities for use.

In large scale food service operations as, for example, of the so-called "fast food" variety and the like, large quantities of shortening are used in the course of the day. At normal room temperature, shortening is generally in solid form. However, it is desirable to have the shortening in liquid form for cooking. Accordingly, when such large quantities of shortening are required, it is also desirable to have a supply of heated shortening in liquid form to be dispensed for use as necessary.

Heretofore, systems for heating and melting shortening often cause excessive smoking of the shortening, particularly during the melting thereof. It is desirable to avoid such smoking. It is also been found desirable to prevent the heating elements from operating when no shortening, or insufficient shortening is present, whether in solid form or liquid form. We have further found that it is desirable to discontinue melting operations, or to take other means to prevent the melting of further shortening in the event the apparatus reaches a predetermined fill level.

OBJECTS AND SUMMARY OF THE INVENTION

Accordingly, it is an object of the invention to provide a novel and approved shortening melter/heater in accordance with the foregoing considerations.

Briefly, and in accordance with the foregoing objects, apparatus for melting and heating shortening comprises: a housing having a top, a bottom and sidewalls; heating grid means mounted in said housing and spaced above said bottom thereof for melting shortening and allowing melted shortening to pass therethrough toward said bottom of said housing; door means for introducing a block of shortening onto said heating grid means; bottom heater means for maintaining the melted shortening at a predetermined temperature; and control means for maintaining control of the operation of said heating grid means and said bottom heater means in a predetermined fashion for initially melting a block of solid shortening introduced onto said heating grid means while substantially preventing smoking of the same, and for thereafter maintaining the melted shortening at said predetermined temperature.

BRIEF DESCRIPTION OF THE DRAWINGS

The features of the present invention which are believed to be novel are set forth with particularity in the appended claims. The organization and manner of the operation of the invention, together with the further objects and advantages thereof may best be understood by reference to the following description, taken in connection with the accompanying drawing in which like reference numerals identify like elements, and in which:

DETAILED DESCRIPTION OF THE ILLUSTRATED EMBODIMENT

Figure 1:
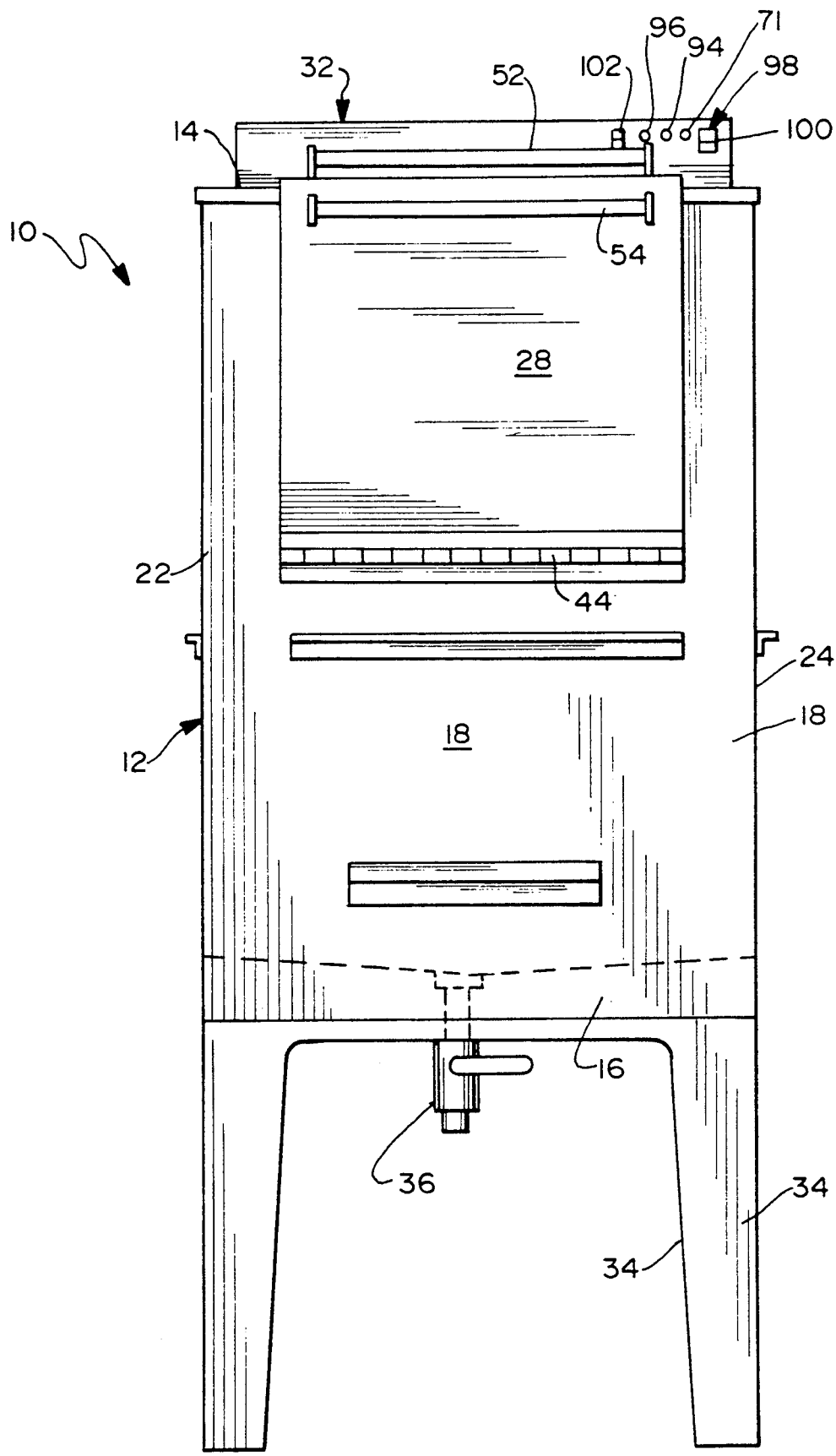
FIG. 1 is a front elevation of a melting and heating apparatus with the invention.
Figure 2:
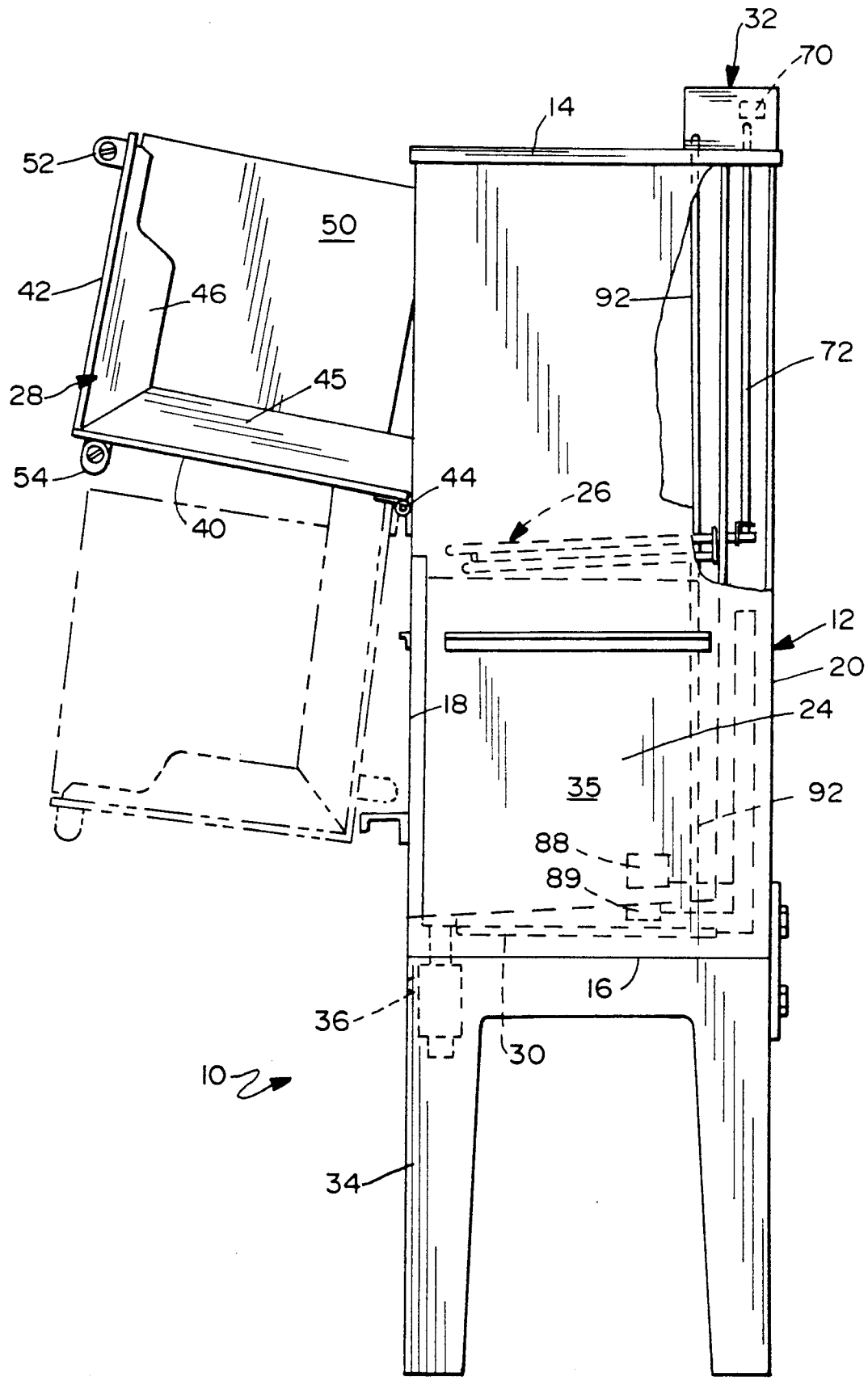
FIG. 2 is elevation of the apparatus of FIG. 1 showing moved positions of a door portion thereof.

Referring now to the drawings and initially to FIGS. 1 and 2, the melting and heating apparatus of the invention is designated generally by the reference numeral 10. Preferably the apparatus illustrated and described herein is used for melting and heating shortening, however the invention is not so limited.

Figure 3:
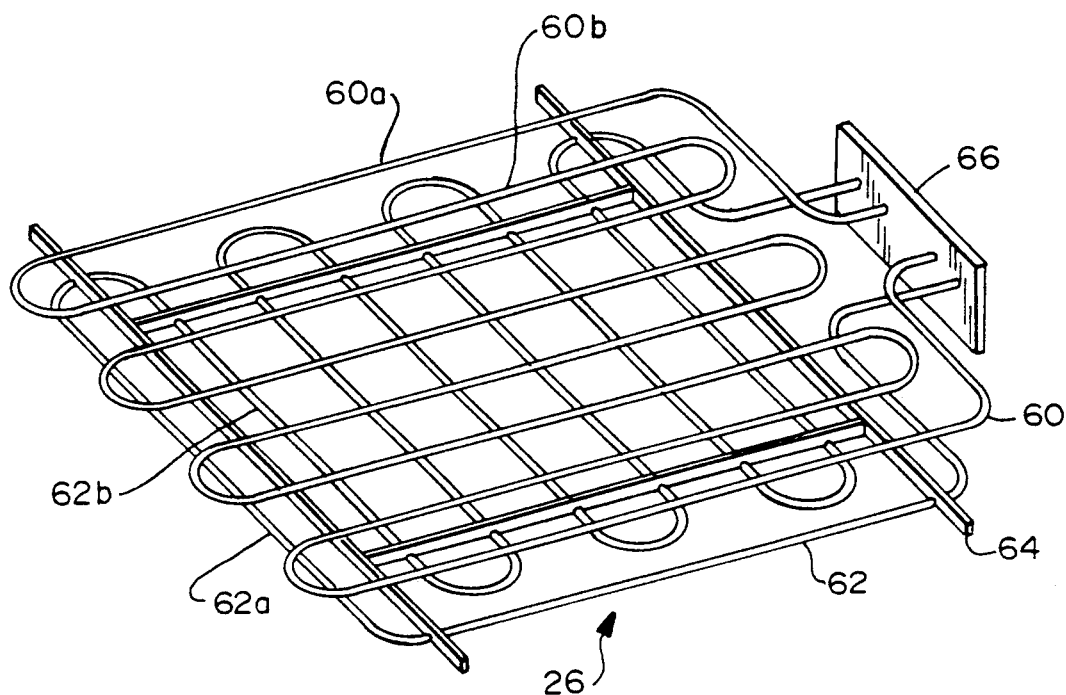
FIG. 3 is a perspective view of a heating grid construction of the apparatus of the invention.
Figure 4:
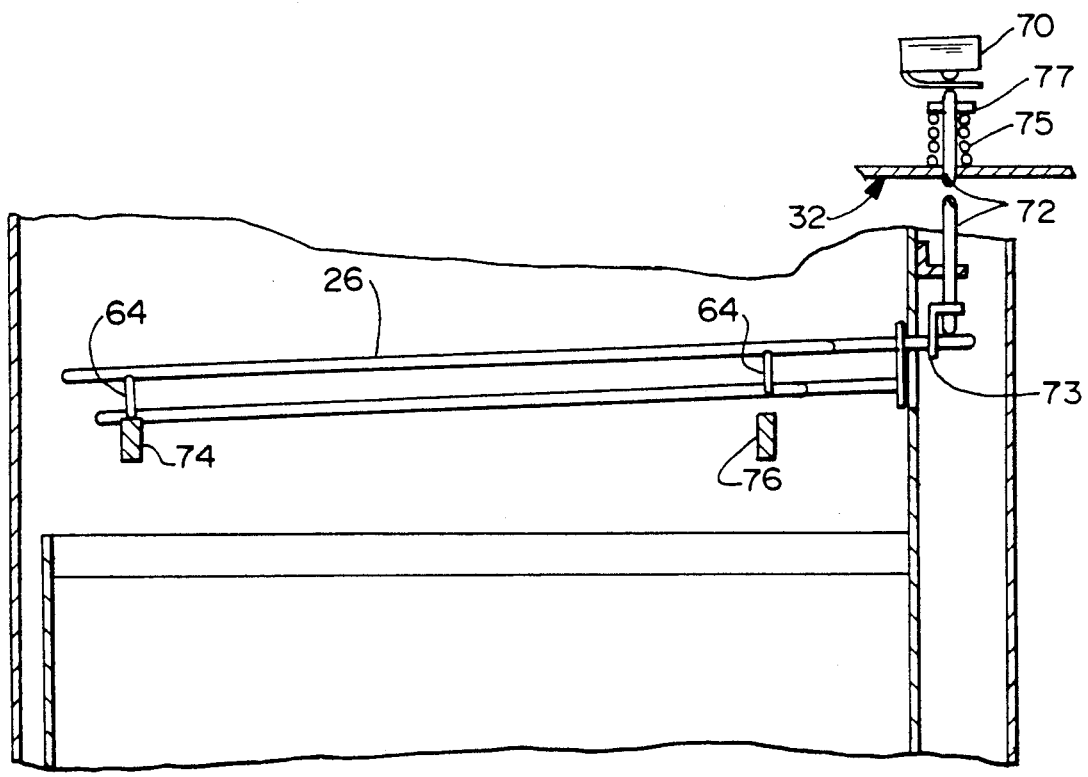
FIG. 4 is a partial sectional view showing the heating grid apparatus of FIG. 3 mounted to the apparatus of the invention.

As viewed in FIGS. 1 and 2, the apparatus includes a housing 12 comprising a top wall 14, a bottom wall 16 and a plurality of sidewalls 18, 20, 22 and 24, which run between and join the respective top and bottom walls 14 and 16. A heating grid, or heating grid means 26, which will be described in further detail hereinbelow with reference to FIGS. 3 and 4, is mounted in the housing and spaced above the bottom 16. As will be more fully explained, the heating grid means is arranged to receive a block of solid shortening and for at least partially melting the shortening to such an extent that the shortening will pass therethrough and into the bottom of the housing. A door assembly or door means 28 is also provided and hingedly mounted to the housing for introducing a block of shortening onto the heating grid or grid means 26.

A bottom heater or heater means 30 is mounted adjacent the bottom 16 of the housing for maintaining melted shortening therein at a predetermined temperature. Preferably, the bottom heater 30 comprises a large area surface heater attached at an outside bottom surface of the housing 12 so as to apply heat to the bottom 16 of the housing. Control means, indicated in FIGS. 1 and 2 as control panel 32 is arranged for controlling the operation of both the heating grid means 26 and bottom heater means 30 in a predetermined fashion for initially melting a block of shortening which is introduced onto the heating grid means 26 while substantially preventing smoking of the shortening during the melting process, and for maintaining melted shortening held in the housing below the grid 26 at a desired, predetermined temperature. Generally speaking, it is considered desirable to initially melt the shortening as rapidly as possible and to thereafter hold the melted shortening at a temperature of on the order of 125° F.

The embodiment illustrated in FIG. 1 further includes a suitable stand or leg assembly 34 arranged for holding the tank some convenient distance from a floor or other support surface for operation. However, the tank may also be mounted to a wall, if desired, or to any other support means for holding the same, and more particularly for holding an outlet spigot member 36 thereof at a desired level for dispensing shortening.

As illustrated in FIG. 1, the door means or portion 28 comprises a generally L-shaped door member having respective panels 40, 42 which form portions of the sidewall 18 and top wall or surface 14 of the housing 12. The door 28 is hingedly mounted at a hinge 44 which is preferably set at a level slightly above the level of the heating grid 26. In the illustrated embodiment, the door also is provided with partial side or edge panels, or guides, 44, 46 to embrace and surroundingly engage a block of shortening (diagrammatically indicated at reference numeral 50), in place on the door for introduction onto the heating grid 26.

As best viewed in FIG. 2, the door is hingedly movable about hinge 44 from a first position shown in phantom line, whereupon a block of shortening may be placed thereupon through a second position indicated in solid line in FIG. 2, whereupon the shortening will begin to slide from the door panel 40 into the housing 12 and onto the grid 26. Finally, the door may be completely closed as indicated in FIG. 1. In order to facilitate operation of the door 28, suitable handles 52, 54 may also be provided, with the latter handle 54 also serving as a suitable support means or member when the door is in the fully opened position as shown in phantom line in FIG. 2, that is, for holding the door at a slight upward angle to place a block of shortening thereupon and prevent the same from sliding outwardly and away from the housing.

Referring next to FIGS. 3 and 4, it will be seen that the heating grid means comprises a pair of generally serpentine, tubular electric heating elements 60, 62. Each of the heating elements 60, 62 defines a plurality of generally parallel sections 60a, 60b, etc., and 62a, 62b, etc., which are preferably arranged substantially at right angles to each other to form a grid-like arrangement. In the illustrated embodiment, each of the heating elements 60, 62 is rated at substantially 400 watts at 120 VAC; however other wattages or voltages may be utilized without departing from the invention. This arrangement may be further maintained by arranging the heating elements as shown in FIG. 3, upon a generally rectangular support frame member 64. Further, the respective heating elements have respective free ends mounted to a plate or connector plate 66 from which they may make suitable electrical connection to the control elements of the invention housed within the control panel or housing 32.

A weight sensitive switch means 70, somewhat diagrammatically indicated in FIG. 4, is used to sense the presence or absence of a predetermined minimum weight of shortening material upon the grid 26. In the illustrated embodiment, this weight sensitive switch means has been illustrated as a switch member 70. An elongate rod 72 is coupled by a bracket 73 to the rear end of the grid and is spring loaded at its opposite end by a spring 75 compressed between control panel housing 32 and a captive washer 77 to normally pull up the grid rear end (grid pivots on a front support 74) and depress the actuator of switch 70. This arrangement is such that a predetermined minimum weight of shortening will cause the grid to seat on rear support 76 such that rod 72 will compress spring 75 and deactivate the switch 70. However, other arrangements of a "weight sensitive" switch may be utilized without departing from the invention, the foregoing being by way of example only.

Figure 5:
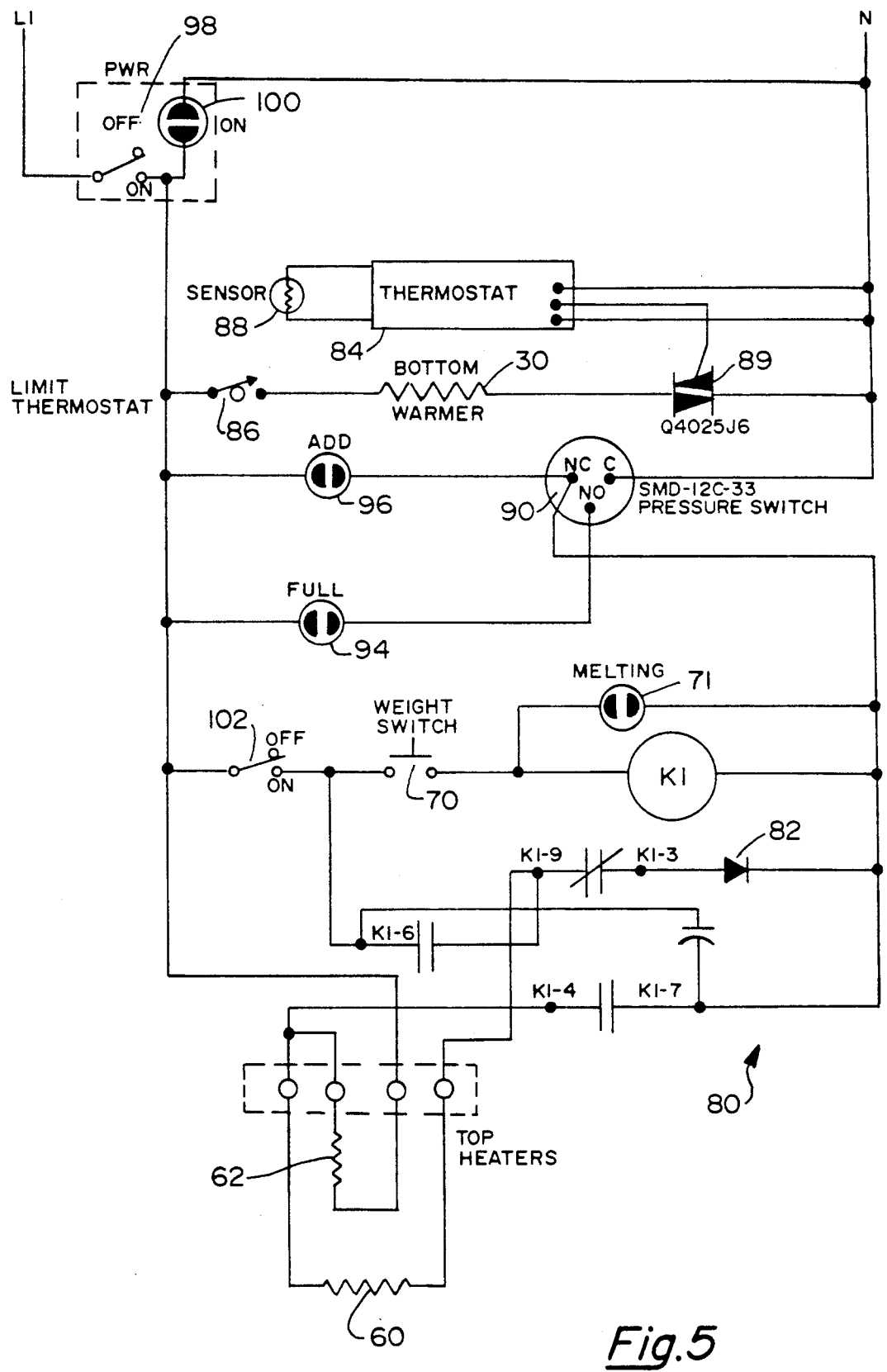
FIG. 5 is a schematic circuit diagram of a control circuit of the apparatus of the invention.

Referring to FIG. 5, the control means further comprise a control circuit 80. It will be seen that this circuit 80 is arranged such that when a block of shortening 50 is placed upon the grid 26, the weight switch 70 will close and energize a relay K1. As the shortening begins to liquify it will flow through the grid structure of the grid heating elements 26 in a partly liquid, partly solid form and into a holding tank 35, which is defined below the heating grid 26 by the respective sidewalls and bottom wall of the housing. It is desirable to melt the shortening as quickly as possible, but yet to maintain the temperature of the grid low enough to prevent the production of smoke. Advantageously, the grid structure helps to meet this requirement since it allows the shortening to flow quickly away from the heating element before its temperature reaches the smoking point.

When most of the block has been melted and has flowed through the grid, the weight on the grid will no longer be sufficient to hold the weight switch 70 closed. The weight switch 70 also energizes a "melting" indicator lamp 71 when it is closed and the relay K1 is energized. Accordingly, the weight switch 70 will again open and the relay K1 will be de-energized. It will be seen that the relay contacts are arranged so as to place the two heaters 60 and 62 in parallel circuit when the weight switch 70 is closed and the relay K1 is energized. However, when the weight switch opens and relay K1 is released, the contacts will place the heaters 60 and 62 in series circuit and place a rectifier 82 in series with them. This will result in about 100 watts being applied to the heaters and a corresponding lower temperature being applied to the small amount of shortening remaining on the grid. This will maintain the temperature of the remaining shortening just high enough to finish melting the same while avoiding heating it to the smoking point.

As the liquid and remaining solid pieces of shortening which escape through the grid structure fall into the tank 35, a large area surface heater comprising the bottom heater 16 is energized to maintain the temperature of the shortening in the tank at substantially 125° F. An electronic thermostat 84 (made by Bunn-O-Matic Corporation, Springfield, Illinois), including a sensor element 88 is provided to sense the temperature of shortening in the tank 35 and control the energization of the bottom heater 30 via a triac 89 (e.g., Q4025J6, Teccor, Irving, Texas) in a suitable fashion to maintain the foregoing desired temperature. In addition, a limit thermostat or safety switch type of apparatus 86 (e.g., T500 Style, Trig Inc., Frankfort, Ky.) is also provided to turn off the bottom heater completely in case of some fault in the electrical circuit or in the event the tank is completely drained, such that the sensor element or portion 88 of the thermostat 84 is no longer immersed in liquid shortening.

A further, pressure activated switching component or switch 90 (e.g., SMD-12C-33 Antunes Controls, Addison, IL) is used in connection with a liquid level sensing tube 92 to indicate when the liquid level in the tank reaches a predetermined upper limit or fill point. Above this point the switch 90 activates a full indicator lamp 94 and interrupts the circuit to the top heaters 60, 62 to discontinue melting of any portion of a block 50 present on the grid 26, to avoid causing an overflow in the tank 35. Below this predetermined upper level, the pressure switch activates an add indicator lamp 96.

A power switch 98 is also provided and may also be provided with a suitable "on" indicator lamp 100. A further on/off switch 102 is also shown in the illustrated embodiment for independently controlling power supplied to the weight switch 70 and associated circuits for controlling the top heaters 60, 62 which form the heating grid 26.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

We claim:

1. Apparatus for melting and heating shortening, comprising: a housing having a top, a bottom and sidewalls; heating grid means mounted in said housing and spaced above said bottom thereof for heating shortening and allowing at least partially melted shortening to pass therethrough toward said bottom of said housing; door means mounted to said housing for introducing a block of shortening onto said heating grid means; bottom heater means mounted adjacent said housing bottom for completing the melting of said shortening and for maintaining melted shortening at a predetermined temperature; and control means for maintaining control of the operation of both said heating grid means and said bottom heater means in a predetermined fashion for at least partially melting a block of shortening introduced onto said heating grid means to such an extent that the shortening will flow through the grid means into a lower portion of the housing, while substantially preventing smoking of the same, and for maintaining the melted shortening in said lower portion of said housing at said predetermined temperature; wherein said control means comprises weight sensitive switch means for producing a weight signal corresponding in a predetermined fashion to the weight of the shortening on said heating grid means and control circuit means responsive to said weight signal for controlling the temperature of said heating grid means in accordance with the weight of shortening present thereupon in such a fashion as to substantially avoid smoking of the shortening.

2. Apparatus according to claim 1 wherein said heating grid means comprises a pair of serpentine tubular electric heating elements, each defining a plurality of parallel sections, said parallel sections of the respective heating elements being arranged substantially at right angles to each other to form a grid.

3. Apparatus according to claim 2 wherein said heating elements are rated at substantially 400 watts at 120 VAC.

4. Apparatus according to claim 1 wherein said bottom and sidewalls define a tank for holding a supply of melted shortening below said heating grid means and wherein said control means includes thermostat means for producing a temperature signal corresponding to the temperature of shortening in said tank, and control circuit means responsive to said temperature signal for controlling operation of said bottom heater means so as to maintain the shortening in said tank at the predetermined temperature.

5. Apparatus according to claim 4 and further including lower limit switching means responsive to the level of shortening in said tank for turning off said bottom heater means when the level of shortening in said tank falls below a predetermined level.

6. Apparatus according to claim 4 and further including upper limit switching means responsive to the level of shortening in said tank for turning off said grid heating means when the shortening in said tank reaches a predetermined level.

7. Apparatus according to claim 6 and further including full indicator means and add indicator means respectively coupled to said upper limit switching means for producing an observable full indication when the level reaches said predetermined upper level and for producing an observable add indication before said level of shortening reaches said predetermined upper level.

8. Apparatus according to claim 1 wherein said bottom heater means comprises a large area surface heater attached at an outside bottom surface to said housing so as to apply heat to said bottom of said housing.

9. Apparatus according to claim 1 wherein said heating grid means comprises a pair of serpentine tubular electric heating elements each defining a plurality of parallel sections, the parallel sections of the respective heating elements being arranged at substantially right angles to each other to form a grid.

10. Apparatus according to claim 9 wherein said weight sensitive switch means produces a first signal when a given minimum weight of shortening is present on said heating grid means, and a second signal when said minimum weight is not present thereon, and wherein said circuit means includes means responsive to said first signal for coupling said heating elements in parallel circuit and responsive to said second signal for coupling said heating elements in series circuit.

11. Apparatus according to claim 1 wherein said door means is generally L-shaped to surroundingly hold at least two sides of a block of shortening and is hingedly mounted to a sidewall of said housing such that the door forms portions of an adjacent side and top wall of said housing, and such that said sidewall portion defined by said door guides a block of shortening to slide onto the heating grid means as the door is closed.

12. Apparatus for melting and heating shortening, comprising: a housing having a top, a bottom and sidewalls; heating grid means mounted in said housing and spaced above said bottom thereof for heating shortening and allowing at least partially melted shortening to pass therethrough toward said bottom of said housing; door means mounted to said housing for introducing a block of shortening onto said heating grid means; bottom heater means mounted adjacent said housing bottom for completing the melting of the shortening and maintaining melted shortening at a predetermined temperature; and control means for maintaining control of the operation of both said heating grid means and said bottom heater means in a predetermined fashion for at least partially melting a block of shortening introduced onto said heating grid means to such an extent that the shortening will flow through the grid means into a lower portion of the housing while substantially preventing smoking of the same, and for maintaining the melted shortening in said lower portion of said housing at said predetermined temperature; and wherein said door means is generally L-shaped to surroundingly hold at least two sides of a block of shortening and is hingedly mounted to a sidewall of said housing such that the door forms portions of an adjacent side and top wall of said housing, and such that said sidewall portion defined by said door guides a block of shortening to slide onto the heating grid means as the door is closed.

* * * * *